United States Patent

[11] 3,596,076

| [72] | Inventor | Rhoderick H. Zimmerman<br>Canoga Park, Calif. |
|---|---|---|
| [21] | Appl. No. | 750,358 |
| [22] | Filed | Aug. 5, 1968 |
| [45] | Patented | July 27, 1971 |
| [73] | Assignee | Paul E. Adams and Gary E. Lande,<br>Trustees<br>Los Angeles, Calif. |

[54] CONVERTER CIRCUITRY
9 Claims, 8 Drawing Figs.

[52] U.S. Cl. ........................................ 235/197,
235/189
[51] Int. Cl. ........................................ G06g 7/26,
G06g 7/22
[50] Field of Search ........................................ 235/197,
189, 190, 191, 192, 186; 328/31, 129, 140, 150,
160, 133, 134; 307/232; 324/140

[56] References Cited
UNITED STATES PATENTS

| 2,965,299 | 12/1960 | Gordon | 235/186 |
| 3,430,855 | 3/1969 | Hartwell et al. | 235/197 |
| 3,473,011 | 10/1969 | Schmid | 235/186 X |
| 3,479,604 | 11/1969 | Abernathy | 307/232 X |

Primary Examiner—Malcolm A. Morrison
Assistant Examiner—Joseph F. Ruggiero
Attorney—Miketta, Glenny, Poms and Smith ABSTRACT: Converter for receiving input signals which are sine and cosine functions of an unknown angle $\theta$, and for producing an output signal X which is virtually linear with $\theta$ as the latter varies over a range of 360°, including linearizing circuitry for producing a function signal segment virtually linear with $\theta$ over a first function quadrant from −45° to +45°, based upon the relationship $$X = \sin \theta / (1 + \tfrac{1}{2} \cos \theta)$$

and circuitry for substituting trigonometrically equivalent values for the sine and cosine input signals when $\theta$ lies outside the first function quadrant and combining circuitry for forming a continuous output signal over a plurality of function quadrants by adding to function signal segments of other function quadrants, a linking signal constituting the appropriate integral multiple of the difference in magnitude of the function signal segment between upper and lower function quadrant limits. The function signal segment for each quadrant is generated by integrating or averaging over a complete cycle a rectangular waveform having a constant on-time, an amplitude proportional to $\sin \theta$, and an off-time whose duration is proportional to $\tfrac{1}{2} \cos \theta$. In order to correct for fluctuations of supply voltage, reference compensation circuitry may be provided including means for increasing the duration of off-time by a small time increment having a nominal value corresponding to nominal supply voltage and varying from nominal in accordance with supply voltage fluctuations. The preferred form of circuitry includes a monostable multivibrator, or "one-shot," whose rectangular wave output determines the constant on-time of the cycle. During operation the one-shot is triggered by a feedback delay circuit providing the off-time above mentioned. At startup, to insure that the one-shot is triggered, a reset circuit including a monitor senses the output of the one-shot and, in the absence of an output signal therefrom, triggers the one-shot by applying to the one-shot the output of an astable or free-running multivibrator.

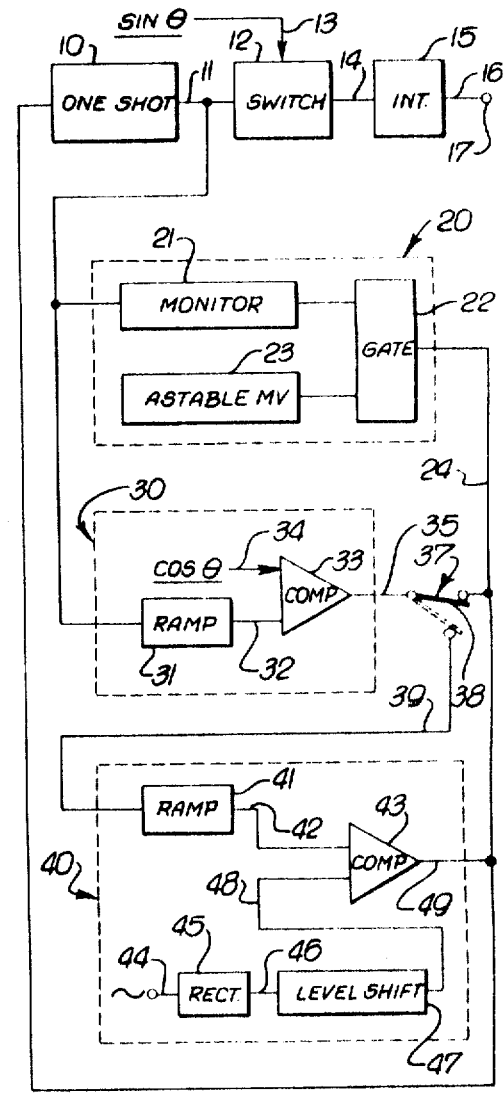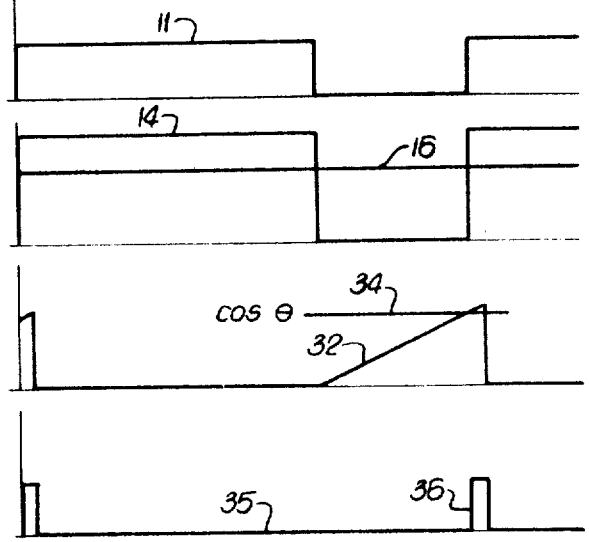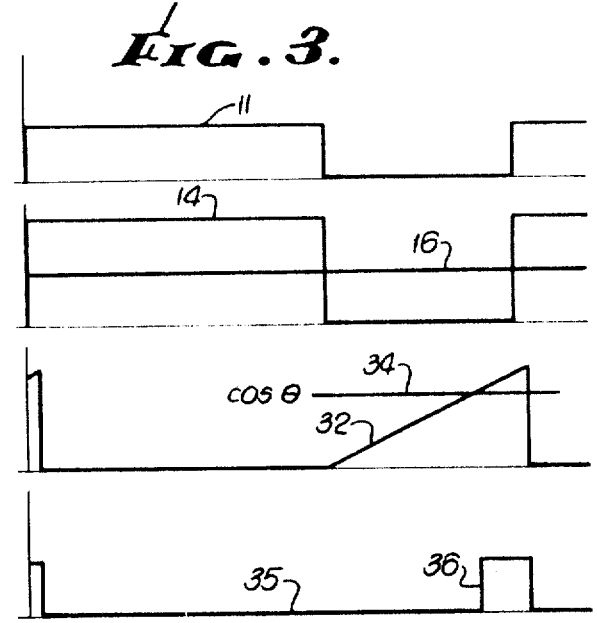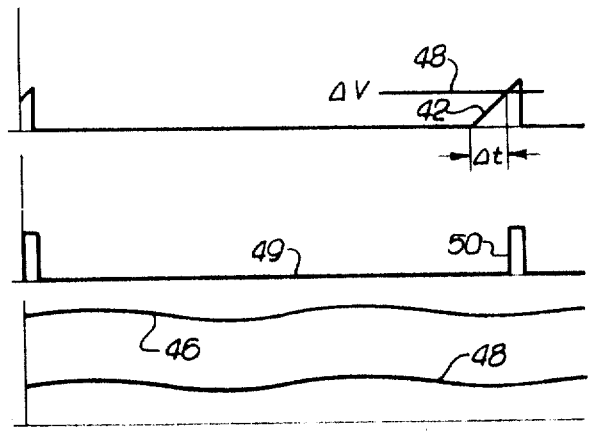

FIG. 4.
| INPUTS | FUNCTION QUADRANTS | | | |
|---|---|---|---|---|
| | FIRST $-45°$ TO $+45°$ | SECOND $45°$ TO $135°$ | THIRD $135°$ TO $225°$ | FOURTH $225°$ TO $315°$ |
| AMPLITUDE | $\sin\theta$ | $-\cos(\theta-90°)$ | $-\sin(\theta-180°)$ | $\cos(\theta-270°)$ |
| TIMING | $\cos\theta$ | $\sin(\theta-90°)$ | $-\cos(\theta-180°)$ | $-\sin(\theta-270°)$ |
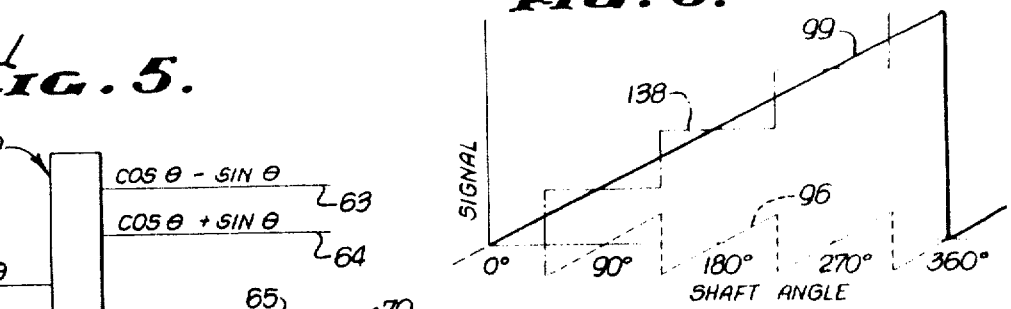
FIG. 6.
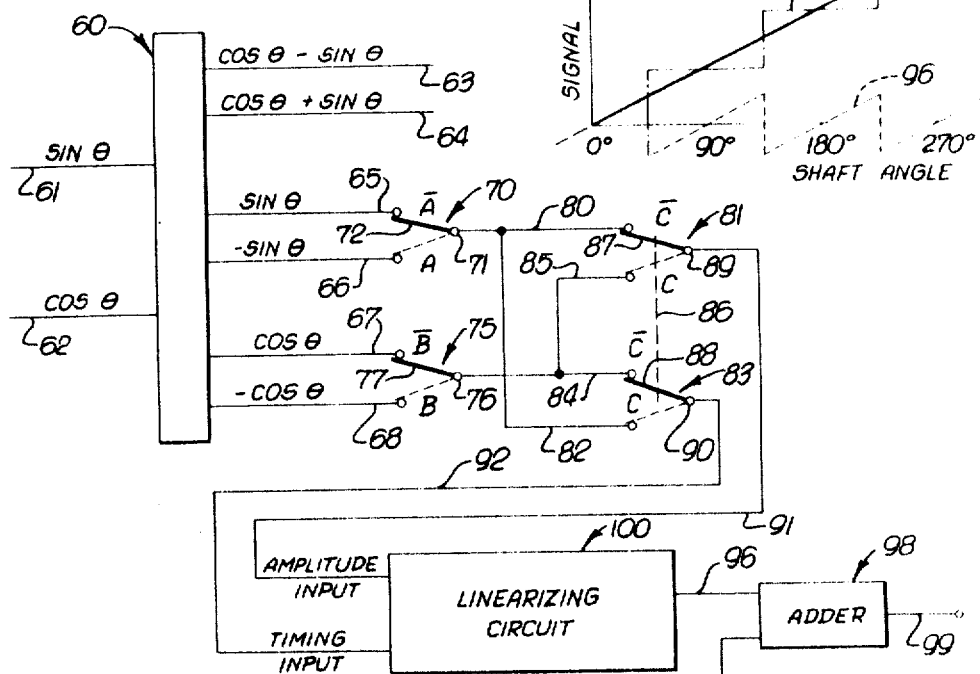
FIG. 5.
INVENTOR.
RHODERICK H. ZIMMERMAN
BY
Miketta, Glenny, Poms & Smith
ATTORNEYS.

INVENTOR.
RHODERICK H. ZIMMERMAN 3,596,076

CONVERTER CIRCUITRY

BACKGROUND OF THE INVENTION

The invention relates generally to electrical measurement, and more particularly to the production of an output signal bearing a predetermined relation to an unknown quantity, illustratively an angle representing the position of a rotatable member such as a shaft. The quantity is variable over a range consisting of a plurality of range segments, the circuitry being such as to generate, for each range segment, an identical function signal segment, and a signal for linking adjacent function signal segments. The invention includes circuitry for summing a function signal segment with an appropriate integral multiple of the linking signal to generate a succession of output signal segments, which are linked together to form an output signal extending over a range corresponding to the range of the unknown variable. In its preferred form hereinafter illustrated and described in detail, the unknown variable is the angular displacement $\theta$ of an element from a fixed position, each function signal segment being virtually linear with such displacement within a quadrant, in accordance with the relationship, $$\sin\theta/1+\tfrac{1}{2}\cos\theta.$$

SUMMARY OF THE INVENTION

The invention includes means for receiving two input signals corresponding to the sine and cosine of an unknown angle which is variable over 360°, generating therefrom intermediate signals respectively bearing intelligence (1) which is a predetermined function of said angle within a quadrant and (2) identifying in which quadrant said angle lies; and generating from the intermediate signals an output signal whose value is continuously said predetermined function of the angle as the latter varies through 360°.

It is accordingly a principal object of the present invention to provide and disclose novel circuitry for producing an output signal having a predetermined relationship with an unknown which is variable over an extended range. Additional objects and purposes of the invention are to produce, in such circuitry, means for generating, from input signals comprising sine and cosine functions of an unknown angle, an output signal which is virtually linear with the angle; to disclose such circuitry embodying the relationship $$\sin\theta/1+\tfrac{1}{2}\cos\theta.$$

provide in such circuitry means for compensation for supply voltage fluctuations; to disclose such circuitry including means for deriving intermediate determinant signals for identifying the specific function quadrant in which the unknown angle lies; to disclose means for generating from such determinant signals a linking signal to be summed with a function signal segment and for producing therefrom an output signal which is virtually linear with the unknown angle. Additional objects and purposes will be understood from a reading of the following description of a preferred embodiment of the invention, taken in connection with the accompanying drawings.

BRIEF DESCRIPTION OF THE DRAWINGS

FIG. 1 is a schematic block diagram of the linearizing circuit of the present invention.

FIG. 2 is a set of waveforms, plotted to a common time abscissa, of important signals of FIG. 1, assuming that no reference compensation is being made.

FIG. 3 is a set of waveforms similar to FIG. 2 except that reference compensation components are included.

FIG. 4 is a tabular showing of the equivalent signals used in the several function quadrants as input signals to the linearizing circuit.

FIG. 5 is a schematic diagram of illustrative circuitry for performing the substitution of equivalent signals and for generating the appropriate incremental signal when $\theta$ lies outside the octant 0°—45°.

FIG. 6 is a graphical showing of the output signal and its components as produced by the circuitry of FIG. 5.

With reference to FIG. 1, a monostable multivibrator or one-shot 10 supplies an output signal in line 11 to switch 12, controlling the input DC signal sin $\theta$ in line 13 which is fed through line 14 to integrator 15. From the latter the integrated value of the sine signal is fed through line 16 to output terminal 17. It is to be kept in mind that a one-shot multivibrator remains in its stable state until triggered to its quasi-stable state by an input pulse; it then reverts to its stable state after a period of time determined by its circuit constants. In the present invention, the duration of the quasi-stable state may desirably be of the order of about 40 microseconds, and for purposes of explanation of the block diagram circuitry of the present invention, that duration may be considered to be the "on-time" of the cycle, during which the DC sine signal is fed to integrator 15. The off-time of the cycle is the time interval or delay from reversion of the one-shot to its stable state until the production of the next triggering pulse by circuitry shown in the lower portions of FIG. 1. In general, the off-time or delay provided by those portions of the circuitry of FIG. 1 may be either (a) a time interval proportional to one-half the input cosine signal; or (b) a time interval proportional to one-half the input cosine signal plus an incremental value for reference compensation, the incremental value being a function of the instantaneous value of the supply voltage. Thus, in circuitry energized by a power supply having very constant output voltage, no reference compensation in accordance with the present invention need necessarily be made. On the other hand, in the more typical case, the power supply may be subject to voltage fluctuations of such magnitude as to adversely affect the accuracy of the output signal unless reference compensation is provided.

Figure 7:
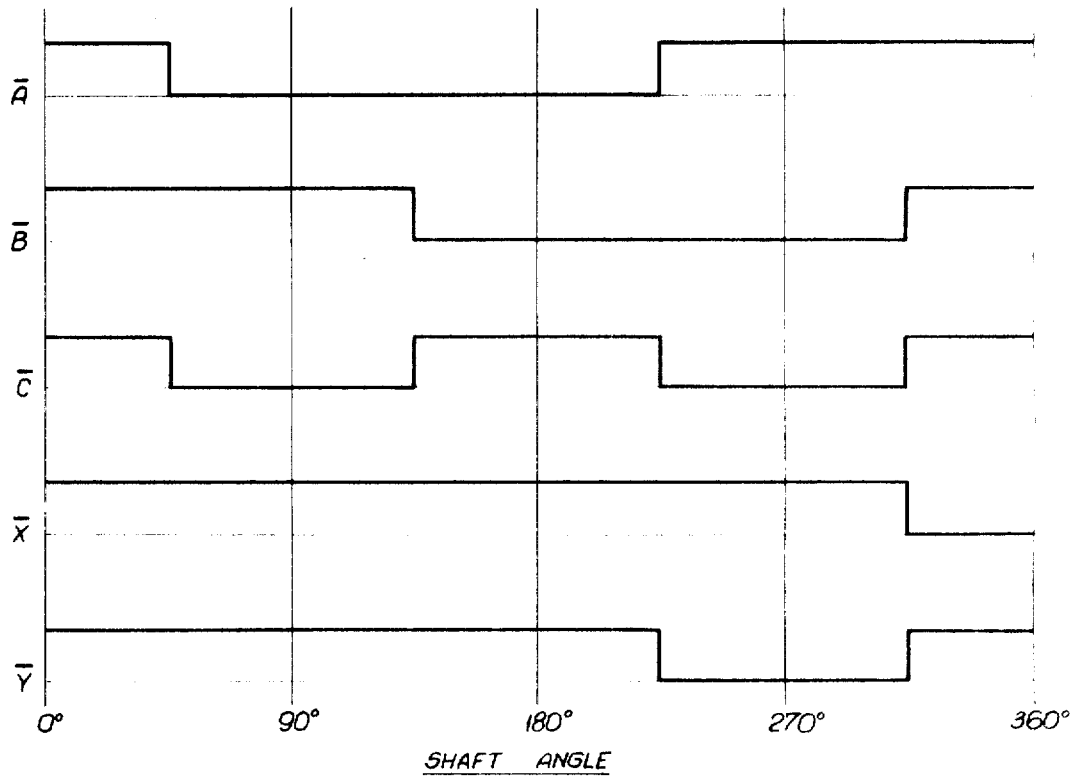
FIG. 7 is a set of timing diagrams for controlling the switching of the several parts of the circuit.

When supply voltage fluctuations are negligible in magnitude and no reference compensation is hence needed, the value of the output signal appearing at terminal 17 will be determined by a fraction whose numerator is sin $\theta$ and whose denominator is $(1+\tfrac{1}{2}\cos\theta)$. Waveforms for this mode of operation are shown in FIG. 2, identified by reference characters of their respective lines in FIG. 1.

On the other hand, when reference compensation is provided, the value of the output signal at terminal 17 will be determined by a fraction whose numerator is sin $\theta$ and whose denominator is $(1+\tfrac{1}{2}\cos\theta+\Delta t)$. Waveforms for this mode are shown in FIG. 3, similarly identified.

With further reference to FIG. 1, there is indicated generally at 20 a dotted outline enclosing starter or reset circuitry; indicated generally at 30 is a dotted outline enclosing circuitry for providing time delay proportional to the value of the input cos $\theta$ signal; and indicated generally at 40 is a dotted outline enclosing circuitry for providing the additional incremental time delay proportional to supply voltage fluctuations, for purposes of reference compensation. It will be noted that each of these is part of a feedback loop including one-shot 10.

More specifically, and with continued reference to FIG. 1, a starter or reset circuit within the dotted outline 20 includes a monitor 21 receiving as its input signal the output signal of one-shot 10 in line 11, and serving to control gate 22. If monitor 21 receives no such signals, it permits gate 22 to pass the rectangular wave output of astable multivibrator 23 through feedback line 24 to one-shot 10, thereby repetitively triggering the latter until normal operation begins. On the other hand, if one-shot 10 is operating normally, monitor 21 serves to keep the gate 22 closed. Hence the output of astable multivibrator 23 appears in line 24 only at startup of the circuit, or during some malfunction of the feedback delay portions of the circuit. Those portions will be now described with reference to the waveforms of FIGS. 2 and 3.

Dotted outline 30 encloses what may be referred to as the cosine function time delay components of the present invention, serving to provide a time delay proportional in duration to ½ cos θ. Circuitry 30 includes a ramp generator 31 triggered by the reversion of one-shot 10 to its stable state and supplying through line 32 to a comparator 33 an output signal linear with time; that signal is one of two signals to be compared in magnitude, the other being an input DC signal proportional to cos θ supplied to the comparator through line 34. As is well known, when the ramp signal in line 32 becomes equal to the cos θ signal in line 34, comparator 33 produces an output signal in line 35, here shown as a positive going pulse 36 in waveform 35 of FIGS. 2 and 3. This occurs at a time interval following the input signal to ramp generator 31 which is proportional to cos θ, and hence to ½ cos θ.

The output pulse 36 of comparator 33 is fed to a switch indicated generally at 37 and serves either to trigger one-shot 10 through feedback line 24, or to trigger a ramp generator in the circuitry 40, depending on the position of blade 38 of the switch. The solid line position of blade 38 accomplishes the former, corresponding to the waveforms of FIG. 2. In its dotted line position, blade 38 is connected through line 39 to circuitry 40, herein referred to as a reference compensation circuitry, to be now described in connection with the waveforms of FIG. 3.

Within reference compensation circuitry 40, pulse 36 in line 35 triggers a ramp generator 41 which supplies an output signal, linear with time, through line 42 to comparator 43. The other signal fed to comparator 43 is derived from the input supply voltage to the circuit. Thus the supply voltage in input terminal 44 is rectified by rectifier 45, supplying a DC signal through line 46 to a level shifter 47, whose output signal is fed through line 48 to comparator 43. The output of comparator 43 appears in line 49, including a pulse 50 occurring at the moment when ramp signal 42 becomes equal in magnitude to the signal in line 48, identified as Δ V in FIG. 3. That output pulse 50, as will be seen, is fed through feedback line 24, constituting the input signal for triggering one-shot 10.

In FIG. 3, waveforms 46 and 48 are plotted to a common ordinate, in order to bring out the fact that the function of level shifter 47 is merely to subtract a constant magnitude from the input signal in line 46, preserving the fluctuations of that signal in the output line 48 of the level shifter. Thus, any variations or fluctuations in input voltage will be proportionately larger in line 48 than the same fluctuations in line 46. For example, the nominal voltage in line 46 might be 12 v. and include ripple or noise of the order of 0.5 v. The nominal value of voltage in line 48 may be, for example, 3 v., so that the 0.5 v. ripple will proportionately be four times that in line 46.

It will be recalled that the time delay provided by cosine function circuitry 30, or by circuitry 30 plus reference compensation circuitry 40, is a variable portion of the denominator of the fraction whose value is derived in accordance with the present invention. It is desirable, in the interest of accuracy and linearity of output, that the variable portion of the denominator not assume very small values. Moreover, when reference compensation is to be included in accordance with the invention as described above, it is desirable that the incremental time duration of reference compensation, identified as Δt in FIG. 3, be small relative to the time delay provided by the cosine function circuitry 30. Thus, with particular reference to the waveforms of FIG. 3, it will be noted that Δt is small relative to the time delay provided by the cosine function itself. Desirably Δt should be about 10 percent of the cosine function time delay, and in any event no more than about 20 percent thereof. In this connection it will be seen that the waveforms are not necessarily to scale, some exaggeration of Δt having been made for clarity of illustration.

Where supply voltage fluctuations make reference compensation necessary, it will be seen that compensation in the manner above described and illustrated tends to vary the denominator in proportion to variations in the numerator despite the presence in the denominator of the constant 1. In effect Δt may be thought of as varying the constant 1 in approximate proportion to variations of sin θ and ½ cos θ. The present technique is effective for relatively small voltage fluctuations, of the order of about 15 percent or less, depending upon the accuracy and linearity required in the output signal.

In the following description, in order to avoid ambiguity and possible confusion with quadrants as conventionally identified in geometry, the term "first function quadrant" will be used to denote the quadrant −45° to +45°. The term "second function quadrant" denotes the quadrant +45° to 135°, and so forth.

As previously mentioned, the output signal of the linearizing circuit of FIG. 1 is acceptably accurate and linear with θ only in the first function quadrant, from −45° to +45°, or within a few degrees beyond those limits. Production of an output signal which is linear with θ over 360° contemplates, in the present invention, formation of an output signal which is a mosaic or composite of two components, a function signal segment generated by the linearizing circuit, and an incremental signal. Means are provided for generating function signal segments when θ lies outside the first function quadrant, by substituting equivalent signals for the DC input signals, sin θ and cos θ discussed in connection with FIG. 1. In the following description those two input signals will be referred to as the amplitude input and the timing input respectively.

Reference to the tabular showing of FIG. 4 will clarify the equivalent signals which are substituted for the amplitude input signal and the timing input signal to the linearizing circuit, for the several function quadrants. In FIG. 5 there is shown illustrative circuitry for accomplishing these substitutions, and for generating the appropriate incremental signal to be combined with the output of the linearizing circuit for all values of θ outside the octant 0° to 45°, in order to form an output signal linear with θ over 360°, as graphically shown in FIG. 6.

With specific reference to FIG. 5, there is indicated generally at 60 circuitry including conventional inverters and adders which need not be described in detail. Circuitry 60 is adapted to receive DC input signals of sin θ in line 61 and cos θ in line 62, and to generate therefrom the indicated output DC signals. Specifically, output lines 63 and 64 provide, respectively, (cos θ−sin θ) and (cos θ+sin θ), which are signals needed in connection with the showings of FIGS. 7 and 8 to be described later. Additional output signals include sin θ in line 65, −sin θ in line 66, cos θ in line 67, and −cos θ in line 68.

Lines 65 and 66 are connected to two terminals of a switch indicated generally at 70, the common terminal 71 of the switch being connected to line 65 when the movable contact arm 72 of the switch is in its solid line position as shown, under the control of timing signal $\overline{A}$, as will be later understood.

In similar manner, lines 67 and 68 are connected to two terminals of a switch indicated generally at 75, whose common terminal 76 may be connected to either of the lines 67 or 68, depending upon the position of the movable contact arm 77 of the switch. As shown in its solid line position, switch 75, under the control of timing signal B, connects the common terminal 76 to line 67.

The signal at switch terminal 71 is fed through line 80 to one terminal of a switch indicated generally at 81, and through line 82 to one terminal of a switch indicated generally at 83. Similarly, switch terminal 76 is connected through line 84 to the other terminal of switch 83, and through line 85 to the other terminal of switch 81. The two switches 81 and 83 are ganged for simultaneous operation, as indicated by the dotted line 86. The switches so ganged are controlled by timing signal C, and it will be noted in the showing of FIG. 5 that the movable contact arms 87 and 88 of switches 81 and 83 respectively connect the common terminals 89 and 90 with lines 80 and 84 respectively.

It may be noted that the solid line positions of the movable contact arms of the several switches in FIG. 5 correspond to operation of the present circuit in the first function quadrant, i.e., −45° to +45°. It will be further noted that the signal appearing at switch terminal 89 is fed through line 91 as the amplitude input signal to the linearizing circuit indicated generally at 100, constituting the circuit shown in FIG. 1 and heretofore described. The signal appearing at switch terminal 90 is fed through line 92 as the timing input signal to the linearizing circuit 100.

The output signal of linearizing circuit 100 in line 96 is fed to an adder or summing amplifier indicated generally at 98 providing an output signal in line 99 which is the sum of the linearized signal in line 96 and the incremental signal generated by the level generator to be now described.

In the lower portion of FIG. 5 there is indicated generally at 110 a dotted outline enclosing components constituting a DC level generator in accordance with the present invention. Generator 110 includes four current sources 112, 116, 120, and 124. These four sources are energized through a common line 130 and are adapted to produce equal currents. They are connected to a common output line 131 through switches respectively indicated generally at 113, 117, 121, and 125. Each of the switches is shown in open position, and each is moved to closed position under the control of timing signals shown adjacent each of the switches. Thus, in the form shown, it is assumed that no timing signal is present. As will be later understood, this condition corresponds to a value of $\theta$ lying in the first octant, 0° to 45°. It will also be seen that, when one or more of the switches 113, 117, 121, or 125 are closed, the appropriate amount of current will flow through resistor 135, creating a voltage drop constituting the output signal in line 138, fed to added 98.

In FIG. 6 there are shown the signals associated with adder 98, each signal being identified in FIG. 6 by the reference character for its line in FIG. 5. Signal 138 is a stepped signal, changing value abruptly between function quadrants.

Figure 8:
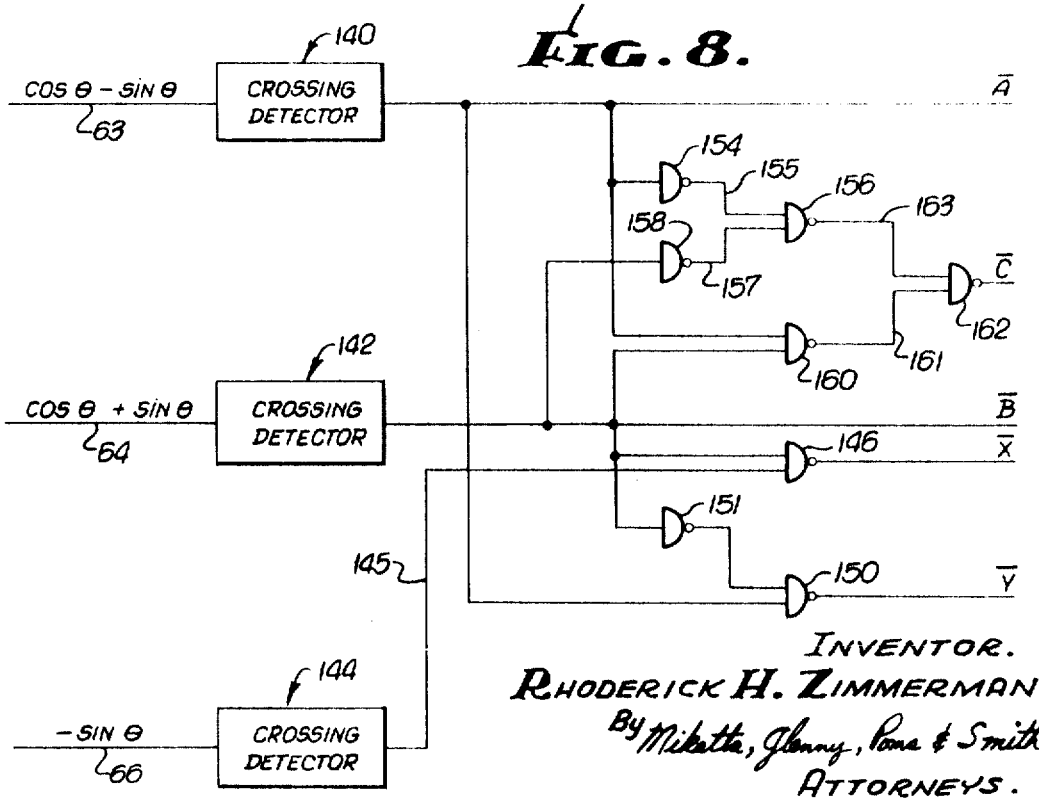
FIG. 8 is a schematic logic diagram of an illustrative technique for deriving the timing signals of FIG. 7.

FIGS. 7 and 8 show respectively the timing signals heretofore referred to in connection with FIG. 5, and an illustrative technique for deriving such timing signals. As shown in FIG. 8, the signal ($\cos\theta - \sin\theta$) in line 63 is fed to a crossing detector indicated generally at 140 providing an output signal $\overline{A}$ having, as appears in FIG. 7, a value of 0 when the input signal is negative and a positive value when the input signal is positive. Similarly, the signal ($\cos\theta + \sin\theta$) is fed in line 64 to another crossing detector indicated generally at 142, whose output signal is $\overline{B}$. A third crossing detector indicated generally at 144 receives as its input signal ($-\sin\theta$) in line 66. The output of crossing detector 144 in line 145 is gated in NAND gate 146 with $\overline{B}$ to produce the output signal $\overline{X}$. Timing signal $\overline{Y}$ is generated by gating $\overline{A}$ and B in gate 150, B being produced at inverting gate 151.

In the upper portion of FIG. 8 there is provided circuitry for producing timing signal $\overline{C}$. Specifically, $\overline{A}$ is inverted by inverter 154, producing signal A in line 155, fed to gate 156. The other input to this gate is B in line 157, derived by inverting $\overline{B}$ in inverter 158. Timing signals $\overline{A}$ and $\overline{B}$ are gated in gate 160, the output signal in line 161 being gated in gate 162 with the output signal in line 163 of gate 156. The output of gate 162 is $\overline{C}$ as appears in FIG. 7.

The crossing detectors of FIG. 8 may take the form of any of a number of well known binary devices, such as Schmitt triggers, as will be readily understood by those skilled in the art. Moreover, the particular gating technique illustrated in FIG. 8 is only one of many techniques by which to derive timing signals to accomplish the desired switching in accordance with the present invention.

An example will serve to illustrate the operation of the circuitry of FIG. 5 when $\theta$ lies outside the octant 0° to 45°. For example, suppose that $\theta=210°$. As will be seen, switch 70 of FIG. 5 is controlled by timing signal A. As appears in FIG. 7, $\overline{A}$ is 0, which is to say that the timing signal A is at its high value, thus actuating switch 70 to its dotted line position seen in FIG. 5, connecting terminal 71 with the signal in line 66.

Similarly, from FIG. 7 it will be seen that $\overline{B}$ is 0 at $\theta=210°$, which is to say that timing signal B is at its high value, thus actuating switch 75 to its position where contact arm 77 connects the signal in line 68 with the switch terminal 76. In the case of timing signal $\overline{C}$, it will be seen from FIG. 7 that $\overline{C}$ is at its high value where $\theta=210°$. Consequently, the position of the ganged switches 81, 83 is that shown in solid lines in FIG. 5, thus connecting the signal in line 80 with line 91, and the signal in line 84 with line 92.

With continued reference to FIG. 5, consider the functioning of level generator 110 when $\theta=210°$. Reference to FIG. 7 shows that under these conditions, $\overline{A}$ and $\overline{B}$ each is at its low value, which is to say that each of signals A and B is at its high value. Consequently, switches 113 and 117 of the level generator are closed, thereby supplying the current output of sources 112 and 116 to the resistor 135, and producing in line 138 a signal corresponding to two steps in FIG. 6.

It will accordingly be seen that the present invention provides means for deriving a signal segment which is virtually exactly linear with an unknown angle over the first function quadrant hereinabove referred to, together with circuitry for generating an incremental signal to be combined with the linearized signal segment to form an output signal linear with $\theta$ over 360°. Reference compensation circuitry may be incorporated in the linearizing circuit, as heretofore discussed linearizing circuit, as heretofore discussed It is recognized that a certain amount of hysteresis is present in the various switches employed. Some amount of hysteresis is desirable, in order that voltage ripple and noise not cause inaccuracy by creating transients resulting from continual switching and hunting when $\theta$ is at or near one of the switching points. Circuitry to provide a selected amount of hysteresis at the switching points is well known and is accordingly not described herein.

The components of the present circuitry are well adapted for solid-state construction. In this connection it will be readily understood that certain of the switches, such as 70, 75 and others shown in FIG. 5, have been shown and described in mechanical form simply for clarity of comprehension.

The circuitry hereinabove described and illustrated is illustrative only, and is not to be understood as limiting the scope of the invention as defined in the appended claims.

In typical circuitry in accordance with the invention wherein the on-time of one-shot 10 is of the order of 40 microseconds, the off-time is desirably substantially less, illustratively of the order of about 10 microseconds. Thus the cosine function time delay may vary over a range of about 7 to 10 microseconds, and the reference compensation time delay, when used, may have a duration corresponding to nominal voltage of about 1 or 2 microseconds. If there were no hysteresis in the switching at 45°, 135°, 225°, 315° and 360°, then the timing input signal would vary over the range of exactly 0.707 to 1.0, corresponding to the value of $\cos\theta$ as $\theta$ varies from −45° to +45°. Because some hysteresis is present and is even desirable, the timing input signal may vary over a slightly greater range, say 0.65 to 1.0; linearity decreases substantially beyond that range.

For clarity of definition, the term "function signal segment" will be understood to refer to the output signal of linearizing circuit 100 when $\theta$ varies over a single function quadrant. Also, the incremental or stepped signal 138 constituting the output signal of DC level generator 110 may be referred to as a "linking" signal to clarify its function in being combined in adder 98 with function signal segments outside the octant 0° to 45°, to form output signal segments continuously linear over 360° in accordance with the invention.

I claim:

1. A linearizing circuit energized by a supply voltage subject to fluctuation from a nominal value, for receiving signals which are sine and cosine functions of an unknown angle variable through a first function quadrant including the range of about −45° to +45°, said signals being herein respectively designated as an amplitude input signal and a timing input signal, and producing therefrom as a function signal segment an output signal virtually linear with said unknown angle, comprising:

means for deriving, as said function signal segment, the average value of a rectangular waveform whose amplitude over a constant on-time is a function of said amplitude input signal and whose off-time comprises a period having a duration which is a function of said timing input signal;

and means for compensating for such fluctuations.

2. The invention as defined in claim 1 wherein said compensating means includes the provision in the off-time of a second period having a duration which is a function of supply voltage fluctuations and is small relative to the first period duration.

3. The invention as defined in claim 2 wherein said unknown angle is also variable through a second function quadrant comprising the range of about 45° to 135°, including means for receiving input signals which are sine and cosine functions of the unknown angle in the second function quadrant and generating therefrom, as said amplitude and timing input signals, trigonometrically equivalent signals for an angle which is 90° less than said unknown angle.

4. The invention as defined in claim 3 including means for generating, when the unknown angle lies in the second function quadrant, a linking signal having a value equal to the difference between the values of the function signal segment at the upper and lower limits of the first function quadrant, and means for summing said function signal segment and said linking signal to form an output signal segment.

5. In a circuit for deriving as an output signal the value of a fraction whose numerator and denominator each includes an input signal subject to fluctuation in accordance with fluctuation of supply voltage from a nominal value and whose denominator additionally includes a constant, the provision of means for averaging over a cycle including an on-time and an off-time a rectangular waveform having a constant on-time and an amplitude proportional to the numerator input signal, and an off-time comprising a first period having a duration proportional to the denominator input signal and a second period having a duration varying from a nominal value as a function of supply voltage fluctuations from nominal.

6. A circuit for measuring the angular position of an element variably positionable throughout first and second adjacent function quadrants and for producing an output signal which is virtually linear with the angular displacement of the element from the lower limit of the first function quadrant comprising:

means for generating, while the element lies in the first function quadrant, a first function signal segment virtually linear with said angular displacement, and constituting a first output signal segment;

means for generating, while the element lies in the second function quadrant, two signals, including
 1. a function signal segment identical to said first function signal segment, and
 2. a linking signal equal in value to the difference between the values of the function signal segment at the upper and lower limits of the first function quadrant; and means for summing said function signal segment and said linking signal to form a second output signal segment.

7. The invention as defined in claim 6 wherein the circuit is energized by a supply voltage subject to fluctuation from a nominal value, and including means for compensating for such fluctuations.

8. A linearizing circuit for receiving signals which are sine and cosine functions of an unknown angle variable through first and second function quadrants including the range of about −45° to +135°, said signals being herein respectively designated as an amplitude input signal and a timing input signal, and producing therefrom as first and second function signal segments output signals virtually linear with said unknown angle through one of said quadrants, comprising:

means for deriving, as said first function signal segment, the average value of a rectangular waveform whose amplitude over a constant on-time is a function of said amplitude input signal and whose off-time comprises a period having a duration which is a function of said timing input signal; and means for receiving input signals which are sine and cosine functions of the unknown angle in the second function quadrant and generating therefrom, as said amplitude and timing input signals, trigonometrically equivalent signals for an angle which is 90° less than said unknown angle.

9. The invention as defined in claim 8 including means for generating, when the unknown angle lies in the second function quadrant, a linking signal having a value equal to the difference between the values of the function signal segment at the upper and lower limits of the first function quadrant, and means for summing said function signal segment and said linking signal to form an output signal segment.